(12) United States Patent
Nishiyama et al.

(10) Patent No.: US 9,667,125 B2
(45) Date of Patent: May 30, 2017

(54) PRODUCTION METHOD OF ROTARY ELECTRIC MACHINE

(71) Applicant: HONDA MOTOR CO., LTD., Tokyo (JP)

(72) Inventors: Tomokatsu Nishiyama, Tochigi (JP); Kazutoshi Takeda, Tochigi (JP); Hideaki Onda, Tochigi (JP)

(73) Assignee: HONDA MOTOR CO., LTD., Tokyo (JP)

(*) Notice: Subject to any disclaimer, the term of this patent is extended or adjusted under 35 U.S.C. 154(b) by 283 days.

(21) Appl. No.: 14/278,453

(22) Filed: May 15, 2014

(65) Prior Publication Data

US 2014/0338183 A1   Nov. 20, 2014

(30) Foreign Application Priority Data

May 17, 2013   (JP) .................................. 2013-105408

(51) Int. Cl.
*H02K 15/085*   (2006.01)
*H01R 43/02*   (2006.01)
(Continued)

(52) U.S. Cl.
CPC .......... *H02K 15/085* (2013.01); *B23K 26/21* (2015.10); *H01R 43/0207* (2013.01);
(Continued)

(58) Field of Classification Search
CPC ............. H02K 15/0081; H02K 15/085; H01R 43/0207; H01R 43/0214; H01R 43/0221;
(Continued)

(56) References Cited

U.S. PATENT DOCUMENTS

| | | | | |
|---|---|---|---|---|
| 4,966,565 A | * | 10/1990 | Dohi ................ | Y10T 29/49179 29/860 |
| 6,403,921 B1 | | 6/2002 | Maeda et al. | |
| 6,915,556 B2 | | 7/2005 | Lenoir et al. | |
| 7,033,233 B2 | * | 4/2006 | Fujimoto .......... | H01R 43/0214 439/874 |
| 7,788,791 B2 | * | 9/2010 | Hara ................. | H02K 15/0081 219/125.11 |
| 8,584,346 B2 | | 11/2013 | Berger et al. | |
| 2003/0159269 A1 | | 8/2003 | Lenoir et al. | |
| 2006/0141874 A1 | | 6/2006 | Lenoir et al. | |

(Continued)

FOREIGN PATENT DOCUMENTS

| | | |
|---|---|---|
| CN | 1695285 | 11/2005 |
| CN | 101432951 | 5/2009 |

(Continued)

OTHER PUBLICATIONS

Japanese Office Action dated Mar. 24, 2015, 2 pages.
Chinese Office Action dated Apr. 5, 2016, 6 pages.

*Primary Examiner* — A. Dexter Tugbang
(74) *Attorney, Agent, or Firm* — Rankin, Hill & Clark LLP (57) ABSTRACT

A production method of rotary electric machines is provided that can laser weld the leading end parts of a plurality of electrical conductors projecting from respective slots with high joint strength. A production method of rotary electric machines that produces a rotary electric machine by joining, by way of laser welding, leading end parts of a plurality of electrical conductors inserted in respective slots provided in a stator core and projecting from the respective slots, includes the steps of matching and arranging the leading end parts of two adjacent electrical conductors; and joining the leading end parts of the two adjacent electrical conductors by irradiating a laser onto the two adjacent electrical conductors from a direction sloped at an angle relative to a joining face of the leading end parts of the two adjacent electrical conductors.

2 Claims, 8 Drawing Sheets

(51) Int. Cl.
*H02K 15/00* (2006.01)
*B23K 26/21* (2014.01)
*B23K 101/38* (2006.01)

(52) U.S. Cl.
CPC ..... *H01R 43/0214* (2013.01); *H01R 43/0221* (2013.01); *H02K 15/0081* (2013.01); *B23K 2201/38* (2013.01); *Y10T 29/49009* (2015.01); *Y10T 29/4921* (2015.01); *Y10T 29/49179* (2015.01)

(58) Field of Classification Search
CPC ............... B23K 26/20; B23K 2201/38; Y10T 29/49009; Y10T 29/49179; Y10T 29/4921
See application file for complete search history.

(56) References Cited

U.S. PATENT DOCUMENTS

2009/0100665 A1    4/2009  Berger et al.
2010/0102664 A1*  4/2010  Chen .................. H02K 15/0081
                                                           310/179

FOREIGN PATENT DOCUMENTS

| JP | 57062762 A | * | 4/1982 |
|----|------------|---|--------|
| JP | 2002-292485 | | 10/2002 |
| JP | 2000-350421 | | 12/2002 |
| JP | 2004-519980 | | 7/2004 |
| JP | 2006-502688 | | 1/2006 |
| JP | 2008221314 A | * | 9/2008 |
| JP | 2009-535009 | | 9/2009 |

* cited by examiner

BEFORE TWISTING AND BENDING

INSIDE ⇐ ⇒ OUTSIDE

FIG. 4B

AFTER TWISTING AND BENDING

INSIDE ⇐ ⇒ OUTSIDE

PRODUCTION METHOD OF ROTARY ELECTRIC MACHINE

This application is based on and claims the benefit of priority from Japanese Patent Application No. 2013-105408, filed on 17 May 2013, the content of which is incorporated herein by reference.

BACKGROUND OF THE INVENTION

Field of the Invention

The present invention relates to a production method of a rotary electric machine.

Related Art

Conventionally, rotary electric machines such as electric motors and power generators that include a stator and rotor have been known. The stator of a rotary electric machine is usually produced in the following way.

First, a plurality of coil elements in which a plurality of electrical conductors is bundled to form a substantially U-shape is prepared. Next, the plurality of coil elements thus prepared is aligned in an annular shape while layering in a circumferential direction, and in this state, the leading end part of each electrical conductor is inserted in each slot provided in an annular shape to the stator core. Next, after the leading end part of the plurality of electrical conductors projecting from each slot is twisted and bent, the leading end parts thereof are joined. The stator of a rotary electric machine is thereby produced.

However, as a method of joining the leading end parts of the plurality of electrical conductors, TIG welding is widely carried out (for example, refer to Patent Document 1). However, in TIG welding, it is necessary to reliably make the earth electrode contact each electrical conductor. For this reason, as a result of the number of earth electrodes also increasing as the number of electrical conductors increases, the device configuration becomes complicated.

Therefore, in recent years, laser welding is being considered as a method of joining the leading end parts of a plurality of electrical conductors. With laser welding, in order to obtain a large melt area in the joining face between the leading end parts thereof, a laser is irradiated along the joining face. According to this laser welding, earth electrodes are unnecessary, and high energy efficiency is obtained.

[Patent Document 1] Japanese Unexamined Patent Application, Publication No. 2000-350421

SUMMARY OF THE INVENTION

Figure 8:
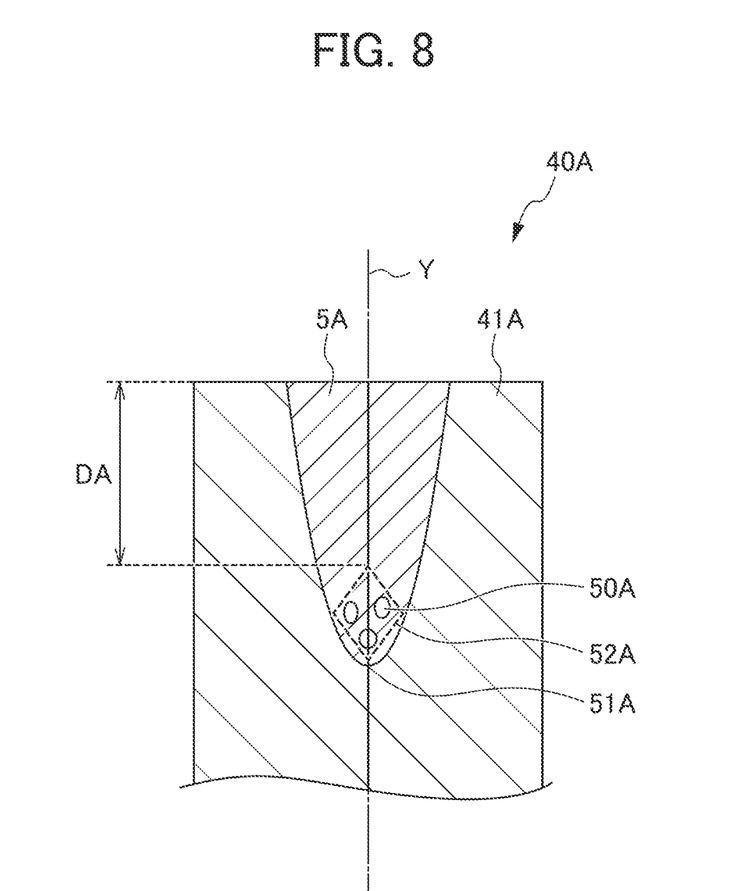
FIG. 8 is a cross-sectional view showing a fusion zone during conventional laser irradiation.

However, with laser welding, since the energy density at the leading end of the fusion zone is high, bubbles called porosity tend to generate in the leading end of the fusion zone. Herein, FIG. 8 is a cross-sectional view showing a fusion zone 5A during conventional laser irradiation. As mentioned above, conventionally, since a laser is irradiated along a joining face Y of a leading end part 41A of an electrical conductor 40A (i.e. from just above an electrical conductor 40A), porosity 50A generating in the leading end 51A of the fusion zone 5A at which the energy density is high is located above the joining face Y. In addition, as shown in FIG. 8, a porosity generation site 52A has a rhomboid shape in which one group of opposite corners is located on the joining face Y, when viewed from a direction orthogonal to the laser irradiation direction. Since this porosity generation site 52A does not effectively function in joining, the effective depth DA of the fusion zone 5A on the joining face that is effective in joining becomes shallow.

In addition, the stress tends to concentrate on the porosity generation site 52A, whereby the joint strength greatly declines. Therefore, from the viewpoint of joint strength improvement, it is desired to suppress the generation of the porosity 50A; however, the current situation is that the generation of porosity 50A in itself cannot be suppressed.

The present invention has been made taking consideration of the above, and an object thereof is to provide a production method of rotary electric machines that can laser weld with higher joint strength than conventionally the leading end parts of a plurality of electrical conductors projecting from each slot.

In order to achieve the above-mentioned object, the present invention provides a production method of rotary electric machines (e.g., the production method of rotary electric machines described later) that produces a rotary electric machine by joining, by way of laser welding, leading end parts (e.g., the leading end part 41 described later) of a plurality of electrical conductors (e.g., the electrical conductor 40 described later) inserted in respective slots (e.g., the slot 2a described later) provided in a stator core (e.g., the stator core 2 described later) and projecting from the respective slots, the method including the steps of: matching and arranging leading end parts of two adjacent electrical conductors (e.g., the electric conductor arrangement step described later); and joining the leading end parts of the two adjacent electrical conductors by irradiating a laser onto the two adjacent electrical conductors from a direction (e.g., the direction sloped at an angle θ relative to the joining face X described later) sloped relative to a joining face (e.g., the joining face X described later) of the leading end parts of the two adjacent electrical conductors (e.g., the joining step described later).

In the present invention, after matching and arranging the leading end parts of two adjacent electrical conductors, the laser is irradiated onto the two adjacent electrical conductors from a direction sloped relative to the joining face of the leading end parts of the two adjacent electrical conductors.

According to the present invention, the leading end of the fusion zone can be arranged leaning to one side of either of the two adjacent electrical conductors. In other words, the porosity generation site of rhomboidal shape in the leading end of the fusion zone can be arranged leaning to one side of either of the two adjacent electrical conductors. The surface area of the porosity generation site on the joining face can thereby be made smaller, and the effective depth of the fusion zone on the joining face that is effective in joining can be kept deeper. Therefore, a higher joint strength is obtained compared to conventionally.

It is preferable for an irradiation position of the laser to be set to between the leading end parts of the two adjacent electrical conductors in the step of joining.

With the present invention, the laser irradiation position is set between the leading end parts of the two adjacent electrical conductors.

It is thereby possible to more reliably maintain the effective depth of the fusion zone on the joining face to be deeper by between the leading end parts of the two adjacent electrical conductors being made within the laser irradiation range, and thus a higher joint strength is obtained.

It is preferable for the leading end parts of the two adjacent electrical conductors to be arranged so as to have different heights in the step of matching and arranging, and for the laser to be irradiated from a side of the electrical conductor having a lower height of the leading end part in the step of joining.

With the present invention, after arranging the leading end parts of the two adjacent electrical conductors so as to have different heights, the laser is irradiated from the electrical conductor side having a lower height of the leading end part.

It is thereby possible to arrange the porosity generation site of rhomboidal shape in the leading end of the fusion zone to lean further to one side of either of the two adjacent electrical conductors. Therefore, the effective depth of the fusion zone on the joining face can be maintained deeper, and high joint strength is obtained more reliably.

According to the present invention, it is possible to provide a production method of rotary electric machines that can laser weld with higher joint strength than conventionally the leading end parts of a plurality of electrical conductors projecting from each slot.

DETAILED DESCRIPTION OF THE INVENTION

Hereinafter, an embodiment of the present invention will be explained in detail while referencing the drawings.

A production method of rotary electric machines according to the present embodiment produces a rotary electric machine by joining the leading end parts of a plurality of electrical conductors inserted into respective slots provided in a stator core and projecting from the respective slots, by way of laser welding.

First, the configuration of the rotary electric machine produced by the production method according to the present embodiment will be explained.

Figure 1:
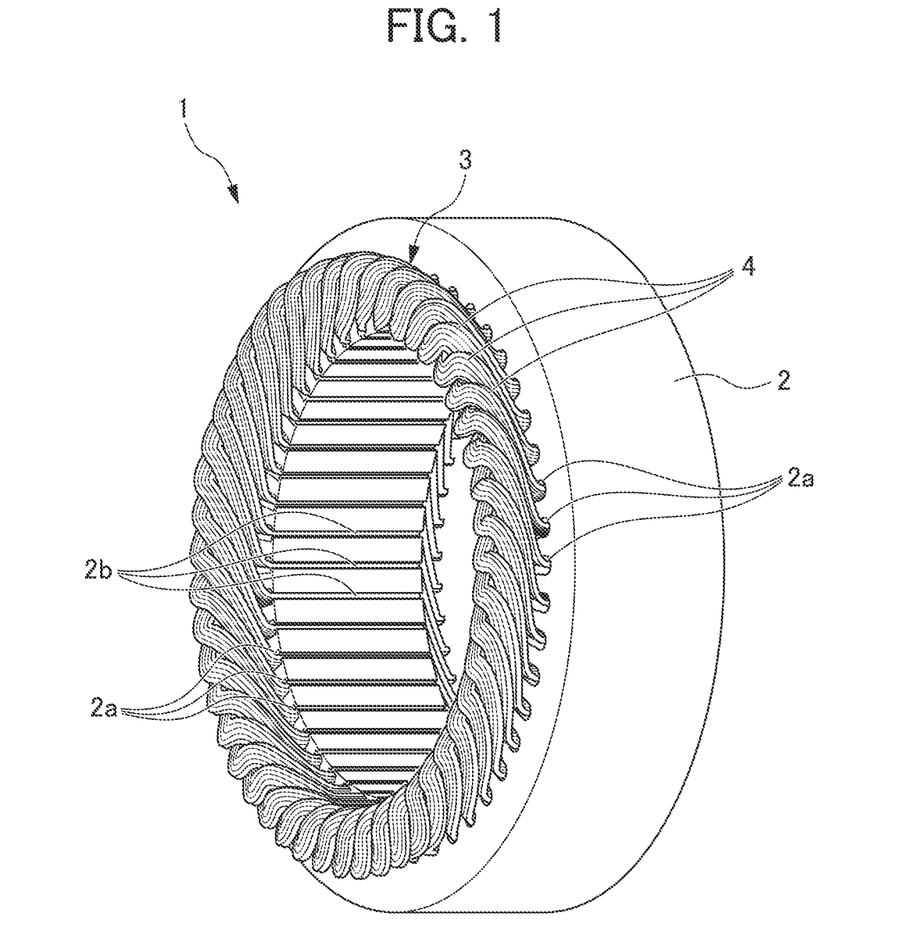
FIG. 1 is a perspective view showing the configuration of a stator of a rotary electric machine according to an embodiment of the present invention.

FIG. 1 is a perspective view showing the configuration of a stator 1 of a rotary electric machine according to the present embodiment. As shown in FIG. 1, the stator 1 is formed in an annular shape. At the inside of the stator 1, a rotor (not illustrated) is arranged to freely rotate, whereby the rotary electric machine is configured.

The stator 1 is configured to include a stator core 2 and coil 3. The stator core 2 is formed in an annular shape. A plurality of slots 2a penetrating in a rotational axis direction is provided in an annular shape to the stator core 2. In other words, a plurality of the slots 2a is provided at every equal interval in the circumferential direction of the stator core 2. Each slot 2a is formed so as to extend radially from the central side of the stator core 2 in a radial direction of a radial direction cross-sectional shape of the stator core 2. Each of the slots 2a communicates with an inner circumferential surface of the stator core 2 via a slit 2b formed at every equal interval in the circumferential direction on the inside of the stator core 2. However, this slit 2b is not essential.

The coil 3 is obtained by joining, by way of laser welding, the plurality of coil elements 4 obtained by bundling a plurality of electrical conductors and molding into substantially U shapes.

Figure 2:
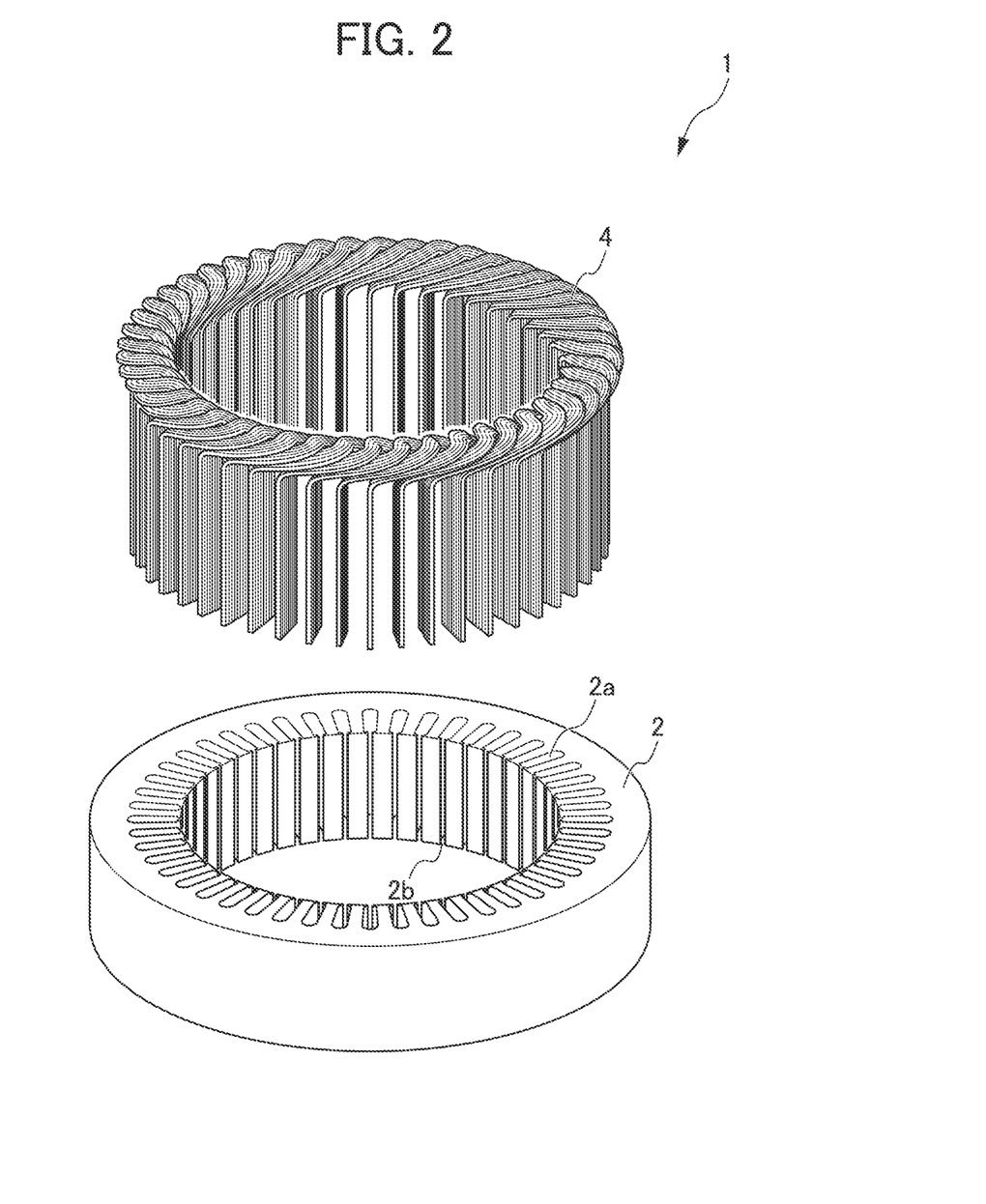
FIG. 2 is a view showing an aspect when a plurality of coil elements is inserted into respective slots of a stator core according to the embodiment.

Herein, FIG. 2 is a view showing the aspect when inserting the plurality of coil elements 4 according to the present embodiment into the respective slots 2a of the stator core 2. As shown in FIG. 2, the coil 3 is obtained, after inserting the leading end part of each electrical conductor into the respective slots 2a in a state in which the plurality of coil elements 4 is aligned in an annular shape while layering in the circumferential direction, by laser welding the leading end parts thereof.

Next, a production method of rotary electric machines according to the present embodiment will be explained.

The production method of rotary electric machines according to the present embodiment includes an electrical conductor arrangement step and a joining step.

The electrical conductor arrangement step according to the present embodiment is a step of matching and arranging leading end parts 41 of two adjacent electrical conductors 40 of a plurality of coil elements 4 inserted into the respective slots 2a of the stator core 2. More specifically, it is a step of matching and arranging the leading end parts 41 of two electrical conductors 40 that are adjacent in the radial direction, to be joined together in the joining step described later. It should be noted that, in the present step, matching and arranging indicates causing the adjacent leading end parts 41 to contact or approach each other so as to be joinable in the joining step.

Figure 3:
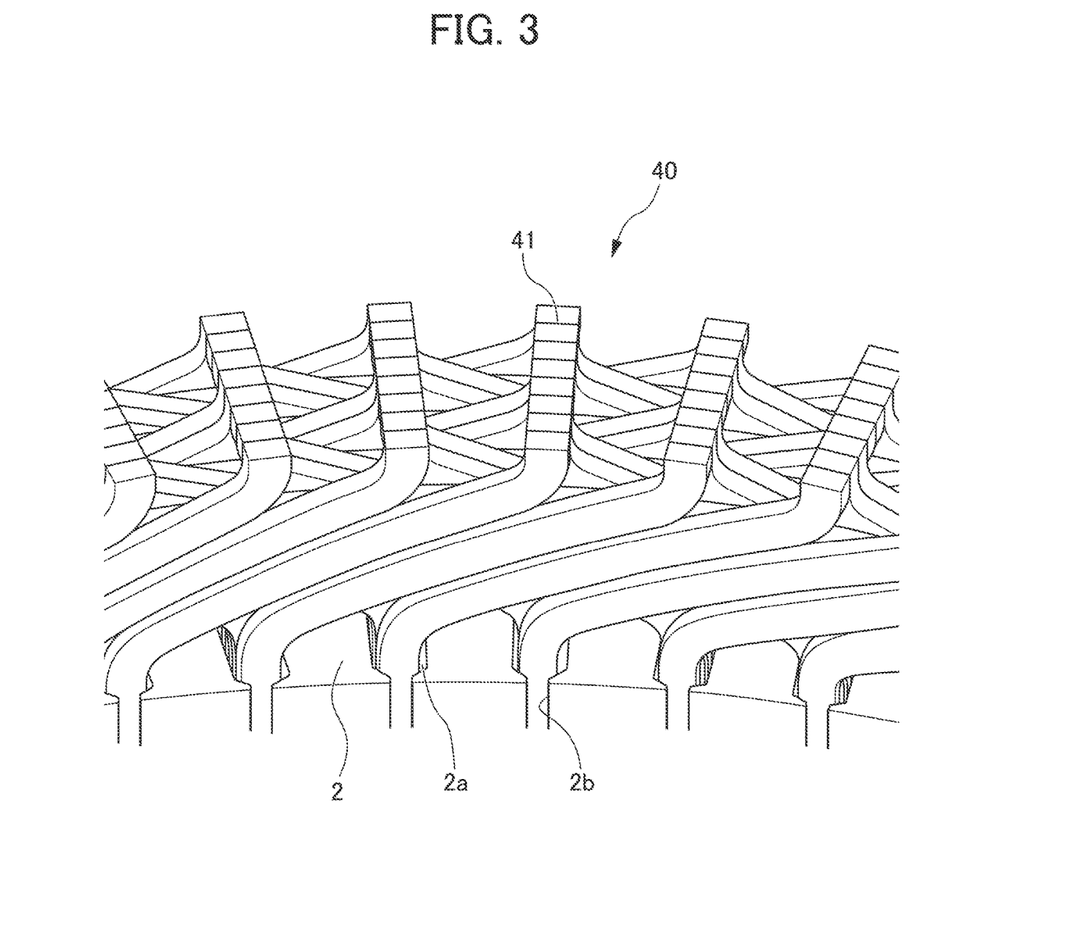
FIG. 3 is a perspective view showing a leading end part of a plurality of electrical conductors according to the embodiment.

Herein, FIG. 3 is a perspective view showing the leading end parts 41 of a plurality of electrical conductors 40 according to the present embodiment. As shown in FIG. 3, in the electrical conductor arrangement step according to the present embodiment, the leading end parts 41 of a plurality of electrical conductors 40 inserted into the respective slots 2a and projecting from the respective slots 2a are twisted and bent in the circumferential direction. More specifically, after twisting the leading end parts 41 in the circumferential direction, the most leading end part thereof is bent in the rotational axis direction.

In more detail, the most outward leading end part 41 of the electrical conductor 40 is twisted and bent to one side in the circumferential direction (clockwise in FIG. 3). Next, the leading end parts 41 of a second and third electrical conductor 40 from the outside are twisted and bent to the other side in the circumferential direction (counter-clockwise in FIG. 3). Next, the leading end parts 41 of a fourth and fifth electrical conductor from the outside are twisted and bent to one side in the circumferential direction (clockwise in FIG. 3). After alternately twisting and bending in opposite directions in this way, the leading end parts 41 of the most inward electrical conductors 40 are finally twisted and bent to one side in the circumferential direction (clockwise in FIG. 3).

By twisting and bending the leading end parts 41 of the plurality of electrical conductors 40 in the above way, the leading end parts 41 of two adjacent electrical conductors 40 in the radial direction to be joined together in the joining step described later are matched and arranged.

Figure 4A:
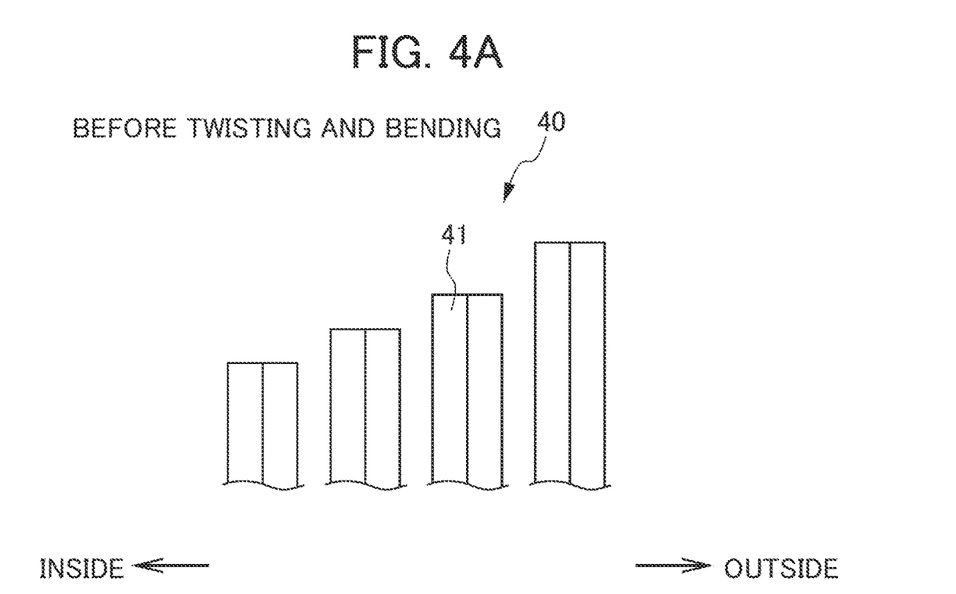
FIG. 4A is a view showing aspects before twisting and bending the leading end parts of a plurality of electrical conductors according to the embodiment.
Figure 4B:
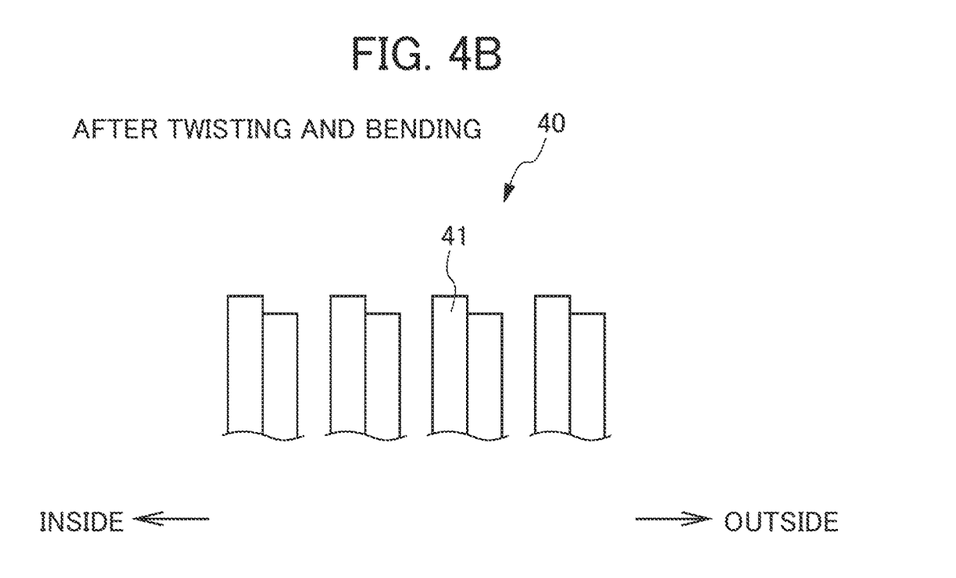
FIG. 4B is a view showing aspects after twisting and bending the leading end parts of a plurality of electrical conductors according to the embodiment.

FIG. 4A is a view showing aspects before twisting and bending the leading end parts 41 of the plurality of electrical conductors 40 according to the present embodiment. FIG. 4B is a view showing aspects after twisting and bending the leading end parts 41 of the plurality of electrical conductors 40 according to the present embodiment. In the example shown in FIG. 4A, prior to twisting and bending the leading end parts 41, the heights of the inside and outside leading end parts 41 of each pair of electrical conductors 40 are made substantially equal. In addition, compared to the pair of electrical conductors 40 arranged on the inside, the heights of the leading end parts 41 are set so as to be higher for pairs of electrical conductors 40 arranged more outwards.

In this example, as shown in FIG. 4B, after twisting and bending the leading end parts 41, the height of the leading end parts at the outside of each pair of electrical conductors 40 and the height of leading end parts 41 at the inside becomes substantially equal. In addition, for the height of the leading end part 41 of each pair of electrical conductors adjacent in the radial direction, the leading end parts 41 of the electrical conductors 40 on the outside are shorter. This is because the length of twisting and bending in the circumferential direction is longer as the electrical conductors 40 are more outwards.

As shown in FIG. 4A and FIG. 4B, after twisting and bending the leading end parts 41, the case of the heights of the each pair of leading end parts 41, i.e. on the inside and outside of the two adjacent electrical conductors 40, differing is preferable due to higher joint strength being obtained. The reason thereof will be described in a latter part.

It should be noted that the present embodiment is not limited to the example shown in FIG. 4A and FIG. 4B, and the heights of the leading end part 41 of each electrical conductor 40 is set as appropriate.

The joining step according to the present embodiment is a step of joining the leading end parts 41 of two adjacent electrical conductors 40 by way of laser welding. More specifically, in the present step, the leading end parts 41 of the two adjacent electrical conductors 40 are joined by irradiating a laser onto the two adjacent electrical conductors 40 from a direction sloped relative to the joining face of the leading end parts 41 of the two adjacent electrical conductors 40.

In the joining step according to the present embodiment, a conventional, known laser device is used. The type of laser light is not limited and, for example, a fiber laser, YAG laser, $CO_2$ laser and semiconductor excitation laser, etc. can be exemplified.

In the joining step according to the present embodiment, the laser irradiation position is preferably set between the leading end parts 41 of the two adjacent electrical conductors 40. In other words, between the leading end parts 41 of the two adjacent electrical conductors 40 is preferably within the range of laser irradiation.

Figure 5:
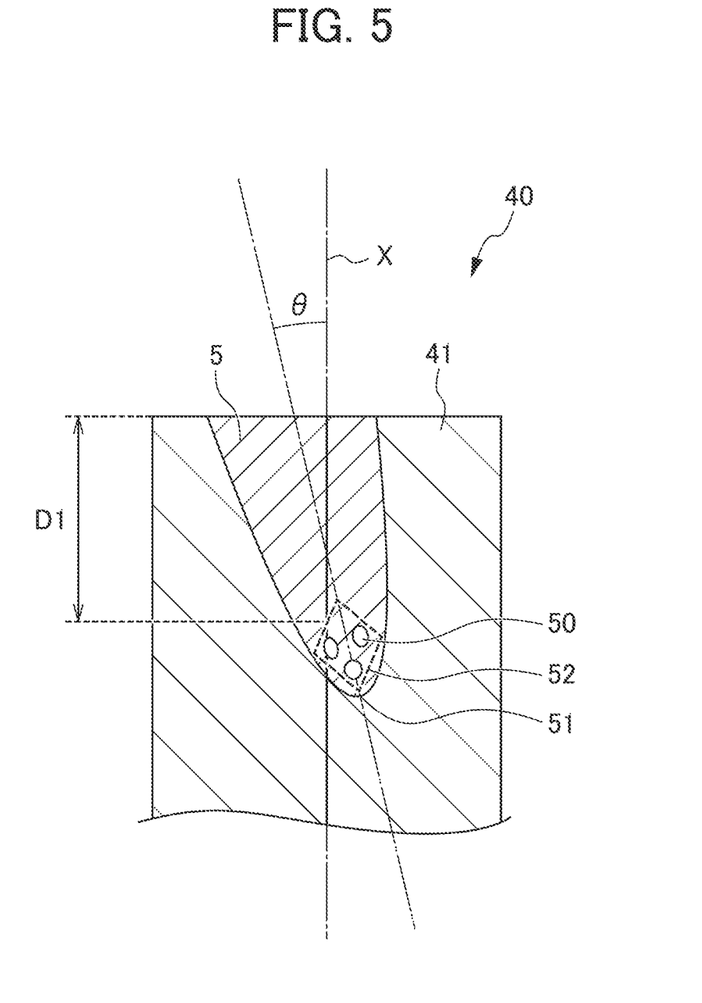
FIG. 5 is a cross-sectional view showing a fusion zone during laser irradiation according to the embodiment.

FIG. 5 is a cross-sectional view showing a fusion zone 5 during laser irradiation according to the present embodiment. As mentioned above, in the conventional example shown in FIG. 8, since the laser is irradiated along the joining face Y of the leading end parts 41A of the electrical conductors 40A (i.e. just above the electrical conductors 40A), the porosity 50A generating in the leading end 51A of the fusion zone 5A in which the energy density is high comes to be located on the joining face Y. In addition, as shown in FIG. 8, when viewing from a direction orthogonal to the laser irradiation direction, the porosity generation site 52A usually has a rhomboidal shape in which a pair of corners is located on the joining face Y. This porosity generation site 52A does not effectively function in joining; therefore, the effective depth DA of the fusion zone 5A on the joining surface that is effective in joining becomes shallow.

In contrast, in the present embodiment, the laser is irradiated onto the two adjacent electrical conductors 40 from a direction sloped at an angle θ relative to a joining face X of the leading end parts 41 of the two adjacent electrical conductors 40, in a case of the heights of the leading end parts 41 of the two adjacent electrical conductors being substantially equal as shown in FIG. 5. Given this, the porosity generation site 52 of rhomboidal shape in the leading end 51 of the fusion zone 5 is arranged at a position leaning to one side of either of the two adjacent electrical conductors 40 (right side electrical conductor side in FIG. 5). It thereby becomes so that the surface area of the porosity generation site 52 in the joining face X is smaller, and the effective depth D1 of the fusion zone 5 on the joining face X that is effective in joining is kept deeper.

Figure 6:
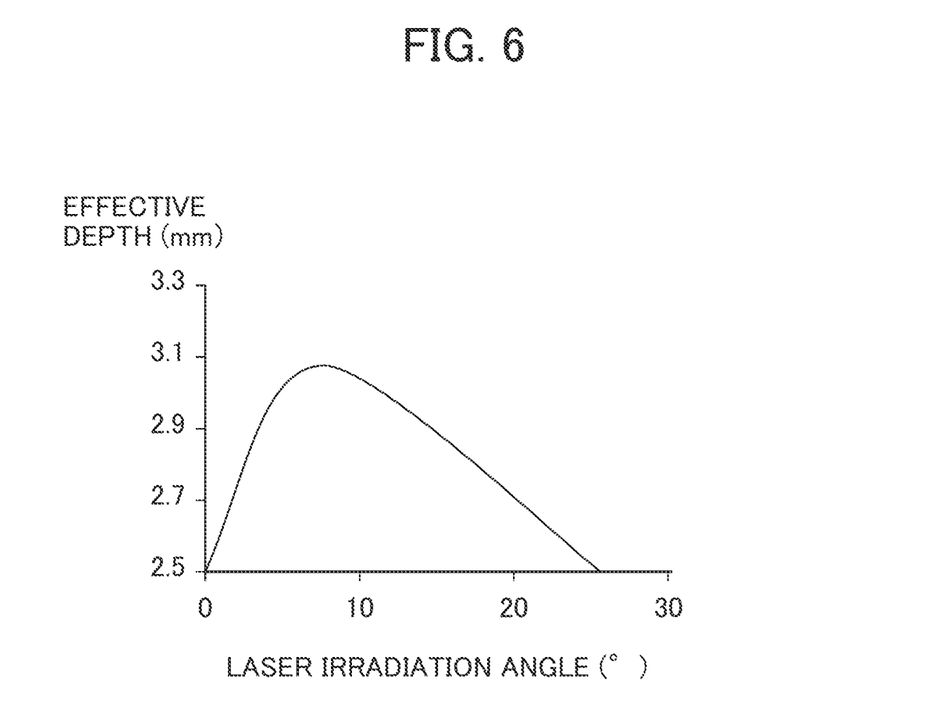
FIG. 6 is a graph showing a relationship between a laser irradiation angle and the effective depth of the fusion zone.

Herein, FIG. 6 is a graph showing the relationship between the laser irradiation angle and the effective depth of the fusion zone. In FIG. 6, the horizontal axis represents the laser irradiation angle (°) relative to the joining face, and the vertical axis represents the effective depth (mm) of the fusion zone on the joining face.

It should be noted that FIG. 6 shows one example when using two copper members having a width in a direction orthogonal to the joining face of 2 mm as the two adjacent electrical conductors 40. At this time, the porosity generation site is a rhomboidal shape having a height in a direction along the joining face of 1.5 mm and a width in a direction orthogonal to the joining face of 0.4 mm.

As shown in FIG. 6, when the laser irradiation angle relative to the joining face is made gradually larger from 0°, it is found that the effective depth of the fusion zone on the joining face becomes larger. Then, in this example, when the laser irradiation angle is 9.46°, the effective depth of the fusion zone on the joining face becomes the maximum value of 3.05 mm. When the laser irradiation angle exceeds 9.5°, it is found that the effective depth of the fusion zone on the joining face becomes smaller accompanying the irradiation angle increasing.

Based on FIG. 6, compared to a case of the laser irradiation angle being 0° as is conventionally, in this example, setting the laser irradiation angle at 5 to 15° is preferable due to being able to maintain a large effective depth of the fusion zone on the joining face. In this case, the effective depth of the fusion zone on the joining face when a laser irradiation angle of 0° is 2.5 mm, and the effective depth of the fusion zone on the joining face when a laser irradiation angle of 9.46° is a maximum value at 3.05 mm; therefore, the effective depth of the fusion zone on the joining face can be made about 20% greater at most, whereby the joint strength can be improved about 20%.

However, in the aforementioned electrical conductor arrangement step, in the case of arranging so that the heights of leading end parts 41 of the two adjacent electrical conductors 40 are different, it is preferable to irradiate the laser from the electrical conductor 40 side having the lower height of the leading end part 41.

Figure 7:
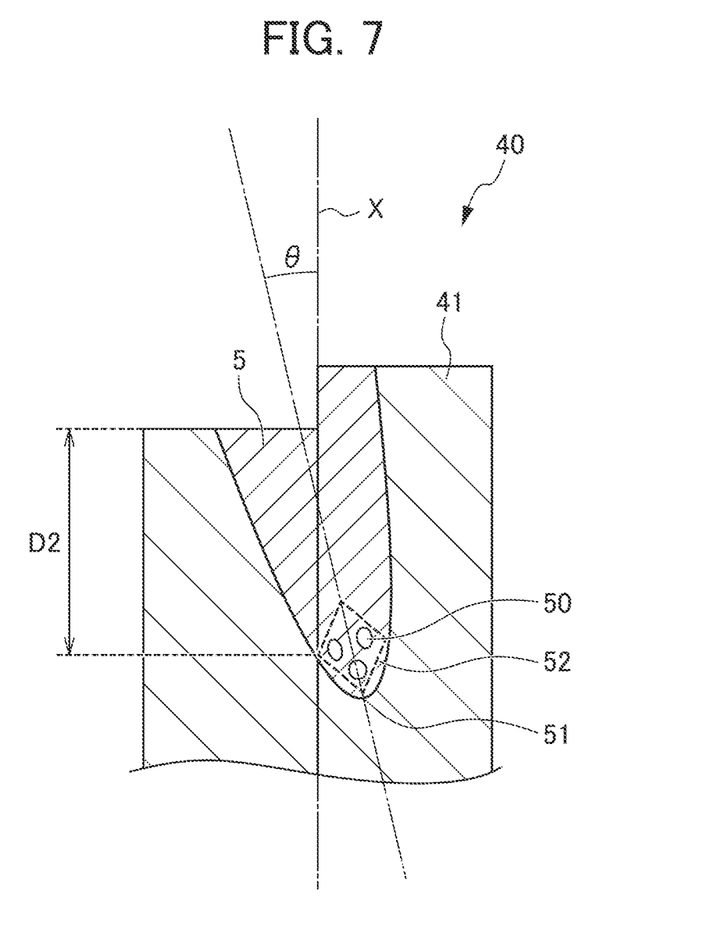
FIG. 7 is a cross-sectional view showing a fusion zone during laser irradiation according to the embodiment.

In addition, in the present embodiment, as shown in FIG. 7, in the case of arranging the heights of the leading end parts 41 of the two adjacent electrical conductors 40 so as to differ, the laser is irradiated from the electric conductor 40 side having a lower height of the leading end part 41 from a direction sloped by an angle θ relative to the joining face X. Given this, the porosity generation site 52 of rhomboidal shape at the leading end of the fusion zone 5 is arranged at a position further leaning to one side among either of the two adjacent electrical conductors 40 (right-side electrical conductor side in FIG. 7). It is thereby made so that the effective depth D2 of the fusion zone 5 on the joining face X is kept deeper.

The following effects are exerted according to the present embodiment.

In the present embodiment, after matching and arranging the leading end parts 41 of two adjacent electrical conductors 40, the laser is irradiated onto the two adjacent electrical conductors 40 from a direction sloped by an angle θ relative to the joining face X of the leading end parts 41 of the two adjacent electrical conductors 40.

According to the present embodiment, the leading end 51 of the fusion zone 5 can be arranged leaning to one side of either of the two adjacent electrical conductors 40. In other words, the porosity generation site 52 of rhomboidal shape in the leading end 51 of the fusion zone 5 can be arranged leaning to one side of either of the two adjacent electrical conductors. The surface area of the porosity generation site 52 on the joining face X can thereby be made smaller, and the effective depth D1 of the fusion zone 5 on the joining face X that is effective in joining can be kept deeper. Therefore, a higher joint strength is obtained compared to conventionally.

In addition, with the present embodiment, the laser irradiation position is set between the leading end parts 41 of the two adjacent electrical conductors 40.

It is thereby possible to more reliably maintain the effective depth D1 of the fusion zone 5 on the joining face X to be deeper by between the leading end parts 41 of the two adjacent electrical conductors 40 being made within the laser irradiation range, and thus a higher joint strength is obtained.

In addition, with the present embodiment, after arranging the leading end parts 41 of the two adjacent electrical conductors 40 so as to have different heights, the laser is irradiated from the electrical conductor 40 side having a lower height of the leading end part 41.

It is thereby possible to arrange the porosity generation site 52 of rhomboidal shape in the leading end 51 of the fusion zone 5 to lean further to one side of either of the two adjacent electrical conductors 40. Therefore, the effective depth D2 of the fusion zone 5 on the joining face X can be maintained deeper, and high joint strength is obtained more reliably.

It should be noted that the present invention is not to be limited to the above-mentioned embodiment, and that modifications and improvements within a scope that can achieve the objects of the present invention are included in the present invention.

What is claimed is:

1. A production method of rotary electric machines that produces a rotary electric machine by joining, by way of laser welding, leading end parts of a plurality of electrical conductors inserted in respective slots provided in a stator core and projecting from the respective slots, the method comprising the steps of:

matching and arranging leading end parts of two adjacent electrical conductors; and joining the leading end parts of the two adjacent electrical conductors by irradiating a laser onto the two adjacent electrical conductors from a direction sloped relative to a joining face of the leading end parts of the two adjacent electrical conductors, wherein two members being composed of the same material and having the same width in a direction orthogonal to the joining face are used as the two adjacent electrical conductors, wherein a laser irradiation angle in relation to the joining face is set at 5 to 15° in the step of joining, wherein the leading end parts of the two adjacent electrical conductors are arranged so as to have different heights in the step of matching and arranging, and wherein the laser is irradiated from a side of the electrical conductor having a lower height of the leading end part in the step of joining.

2. A production method of rotary electric machines that produces a rotary electric machine by joining, by way of laser welding, leading end parts of a plurality of electrical conductors inserted in respective slots provided in a stator core and projecting from the respective slots, the method comprising the steps of:

matching and arranging leading end parts of two adjacent electrical conductors; and joining the leading end parts of the two adjacent electrical conductors by irradiating a laser onto the two adjacent electrical conductors from a direction sloped relative to a joining face of the leading end parts of the two adjacent electrical conductors, wherein two members being composed of the same material and having the same width in a direction orthogonal to the joining face are used as the two adjacent electrical conductors, wherein a laser irradiation angle in relation to the joining face is set at 5 to 15° in the step of joining, wherein an irradiation position of the laser is set to between the leading end parts of the two adjacent electrical conductors in the step of joining, wherein the leading end parts of the two adjacent electrical conductors are arranged so as to have different heights in the step of matching and arranging, and wherein the laser is irradiated from a side of the electrical conductor having a lower height of the leading end part in the step of joining.

\* \* \* \* \*